March 18, 1958 P. U. BARRENECHEA 2,826,901
FRICTION CLUTCH
Filed May 11, 1954 2 Sheets-Sheet 1

INVENTOR
PEDRO UNCETA BARRENECHEA
BY

March 18, 1958 P. U. BARRENECHEA 2,826,901
FRICTION CLUTCH
Filed May 11, 1954 2 Sheets-Sheet 2
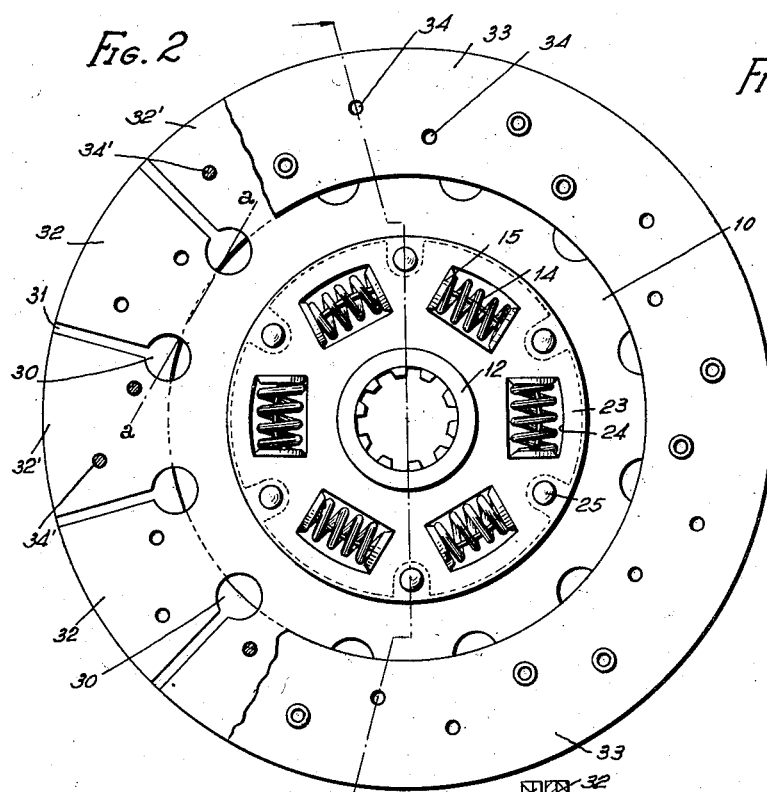
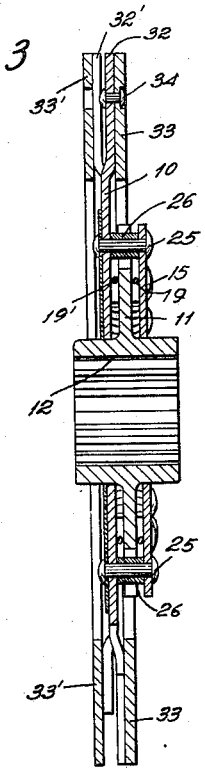
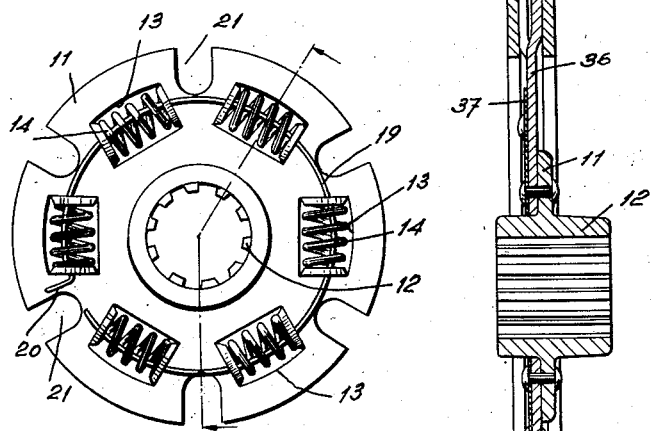
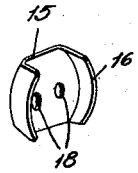
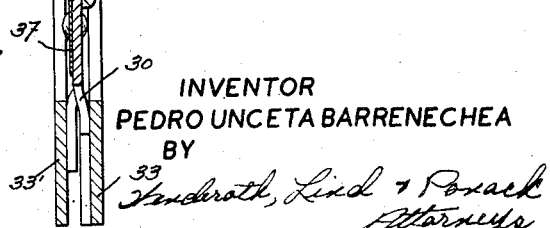
INVENTOR
PEDRO UNCETA BARRENECHEA
BY

United States Patent Office 2,826,901
Patented Mar. 18, 1958

2,826,901

FRICTION CLUTCH

Pedro Unceta Barrenechea, Bilbao, Spain

Application May 11, 1954, Serial No. 429,096

3 Claims. (Cl. 64—27)

This invention relates to the construction of friction clutches for motors and for power transmission in general and more particularly to the construction of clutch plates for motor cars and other vehicles.

One of the objects of the invention is a device for the attachment of the damping springs onto the body of the clutch plates, being said springs retained in their places by simple and economical means, leaving the attachment hidden and eliminating the use of fixing clips and rivets as well as the chance of the fixing device coming loose and causing breakages or damage inside the clutch.

Another object of the invention is the provision of protecting caps between the damping springs and the openings in the plates, said caps contributing to the security of the springs, and preventing the cracks that frequently occur in the corners of those openings.

It is also an object of the invention, to provide an elastic crown clutch plate by means of a particular construction of the slots in the circumference of the disc and also of the fins thus preventing the formation of cracks on the bottoms or inner ends of such slots, and lengthening the life of the whole piece.

A further object of the invention is to obtain a clutch more lasting and more reinforced, avoiding the possible breakages or cracks that frequently occur in the middle of plates on account of the great strain to which they are subjected during the work.

As a whole, according to the invention, clutch plates are produced that will last longer and be more resistant and therefore capable of resisting greater overloads with lesser chances of breakdown.

In the construction of clutch plates it is of greatest importance to secure the fixation of the damping springs to avoid the damages caused by an eventual coming loose of said springs. In a known construction the springs are fixed by means of wires passing through the springs and placed on the outer surfaces at both sides of the disc, being said wires secured to the disc by means of clamps and rivets.

In damped clutch plates according to the invention the damping springs are initially lodged and fixed in the openings or windows of the circular flange that forms part of the hub, applying to the ends of the springs, between them and the edges of the opening against which they rest, respective protecting caps comprising a plate provided with two symmetrical holes placed at a distance corresponding to the thickness of the flange, one on either side of it and two or more bent side projections into which the spring fits. Through these holes and also through the inside of the helicoidal springs on either side of the flange curved wire is threaded, its ends being simply bent or joined, the two wires of the two faces being fastened together by the protecting caps, holding the springs and preventing them from coming loose. On the hub thus formed, the clutch plate properly so called, that bears the friction material is placed on one side, and on the other side the auxiliary plate of smaller size, the two plates being riveted together in the usual way, both being provided with corresponding windows for lodging the springs and protecting pieces, whereby the retaining wires are hidden behind the discs of the friction plate and of the auxiliary plate, every kind of clip, clamp, rivet and other accessories that might cause a breakdown being thus eliminated.

The metal disc that bears the friction material, is provided with radial slots or slits dividing their circumference, that come out at their inner end into a circular opening or bored hole of larger diameter than the width of the slots, forming a series of fins on the circumference, and said fins are bent alternatively to one side or the other in respect to the central plane of the plate. This arrangement of slots with circular openings on their inner ends gives the plate a maximum of elasticity and prevents the forming of cracks on this part of the plate. Moreover, on one of the faces of the metal plate, in its central part and covering the space comprised between the middle and up to a little before the above-mentioned circular openings, a smaller metal plated disc is applied, fixed by means of rivets to the principal plate of the clutch, the central part of the plate thus being more reinforced and capable of resisting greater strains.

The drawings shows the construction of a clutch plate according to the invention.

Figure 2 is a front view of the clutch plate corresponding to Figure 1.

Figure 3 is a sectional view of same.

Figure 4 shows the attachment of the springs to the hub.

Figures 5 and 6 represents two forms of protecting caps for the ends of the springs.

Figure 7 is a sectional view of a clutch plate without springs.

Figure 1:
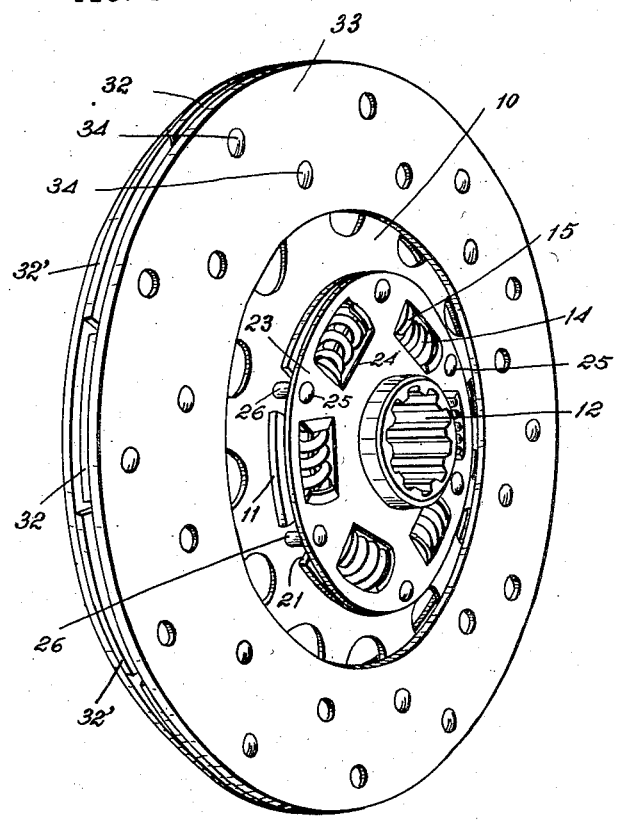
Figure 1 is a perspective view of a damped clutch plate.

As seen in the drawings the clutch plate according to the invention comprises a metal plate disc 10 mounted on resilient form on the circular flange 11 of a central grooved hub 12, said flange 11 of the hub being provided with windows or openings 13 in which fits helicoidal springs 14 fixed directly in said openings forming a unit with the fluted hub.

The springs 14 carries at its ends (Fig. 4), respective protecting caps —15— applied between each end of the spring and the edge of the opening. These protecting caps have the form of a plate provided with side projections 16 (Fig. 5) or with bended corners 17 (Fig. 6) to hold the spring by the outside and besides they are provided in its central portion with two holes 18 on a transversal line, separated from each other at a distance corresponding to the thickness of the flange 11 of the hub. On one side of the hub and through the holes on the same part of these protecting caps as well as through the inside of all the springs a curved steel wire 19 is threaded, one end of which 20, at least, is bent or doubled. On the opposite face another wire 19' is threaded in the same way through the holes of the other side of the protecting caps and through the inside of the springs. The edges of said protecting caps are cut on parallel opposite sides to facilitate the adjustment of the caps in the openings.

The flange 11 of the hub is provided on its edge with a certain number of nicks or notches 21. The clutch plate disc is set on the hub on one of the sides of the flange 11, this plate having openings corresponding to those of the said flange and into which the edges of the protecting caps of the spring heads also fit. On the opposite side of the flange 11 the auxiliary disc 23 is placed, of a lesser diameter and having similar openings 24 to lodge the springs. This auxiliary disc, is fixed concentric to the plate by means of several rivets 25 passing through the sleeves 26 inserted among the two pieces, said sleeves and rivets being lodged with a certain looseness through the notches 21 of the circumference of the flange.

In this construction the springs rest against the openings of the flange as well as against the openings of the friction disc and of the auxiliary disc, through the medium of the protecting caps, giving a large surface of support. The fastening wires that go through the springs are placed directly on the side faces of the flange of the hub and are held by the protecting caps and are, moreover, covered by the clutch plate and the auxiliary disc, whereby not only is avoided the use of clips and rivets for holding the wires, but the outer appearance of the product is improved.

The peripheric part of the principal plate 10 has, at a certain distance from its edge, a certain number of circular openings 30 stretching to the circumference by means of the radial slits or cuts 31 that form a series of fins 32—32' bent wholly alternately towards one side or the other of the central plane of the plate. This bending of the fins towards one side or the other follows a line *a—a* that joins two contiguous openings 30, the material being able to take on gentle curves, eliminating the corners or angles of the cuts.

On the fins bent towards one face of the plate, for instance, the fins 32, a crown of friction material 33 is applied, being fixed to the fins by means of two rivets 34 on each of them. In a similar manner, on the opposite side of the plate, a friction crown 33' is applied, which is also fixed to the alternate fins 32' by means of two rivets 34'. These fixing rivets 34 and 34' do not hold the crown on the opposite side, as, for instance, the crown 33' on one side, on the portions that correspond to the fins 32 of the other side have holes 35 to fit the riveted ends of the rivets 34 of the opposite crown, the same thing happening as regards the crown on the other side.

The edges of the fins are separated along their whole length on one side and/or the other from the central plane of the plate, forming an elastic mounting for the friction crown of great efficiency, since the fins remain flat, without any warping whatsoever, and are situated in planes parallel to each other, and moreover, the lines of flexion do not suffer from the pressure of the parts of the clutch, which gives longer life and greater resistance.

Said peripheric elastic construction is also applicable to clutch plates without elastic hubs, for instance, to clutches composed by a friction disc 36 (Fig. 7) fixed directly by means of rivets to the flange 11 of the hub.

Moreover, the outer face of the friction disc, both in the type with damped hub or with fixed hub, carries a reinforcing metal disc 37 of smaller diameter covering the surface comprised between the central hub and the circumference of the above mentioned circular openings 30, said reinforcing disc being fixed to the friction disc, by means of the same rivets which holds the auxiliary disc as in Fig. 3, or the flange of the hub as in Fig. 7, the central part of the clutch plate being thus more reinforced and capable of resisting greater torsional strains.

I claim:

1. In a friction clutch having an inner member in the form of a hub with a circular flange projecting radially therefrom and an outer member in the form of two discs attached to each other, one on either side of the flange on said inner member, and said members having a plurality of apertures therein aligned with each other to form pockets through said discs and said flange, that improvement comprising resilient coupling means comprising the combination of protecting caps having projections upstanding therefrom, one cap at each end of each pocket and extending through both discs and said flange and each having two holes therein spaced from each other a distance slightly greater than the thickness of said flange and less than the distance between said discs, a plurality of coil spring means in said pockets positioned between said protecting caps, said holes in said caps being within the inside diameter of said coil spring means, and two wires, one on each side of said flange between said flange and said discs and extending in substantially circular paths on said flange and passing through the holes in each of said protecting caps which are on the same side of the flange as the wire and through said spring means, said wires being in contact with said flange and having their ends bent over parallel to the surface of said flange.

2. Resilient coupling means as claimed in claim 1 in which said protecting caps comprise a substantially circular plate having two diametrically opposed semicircular projections upstanding from the edge of said plate embracing the end of one of said spring means.

3. Resilient coupling means as claimed in claim 1 in which said protecting caps comprise a substantially circular plate having four ears upstanding from the edge of said plate embracing the end of one of said spring means.

References Cited in the file of this patent

UNITED STATES PATENTS

| 1,967,344 | Worner | July 24, 1934 |
| 2,028,951 | Reed | Jan. 28, 1936 |
| 2,300,720 | Woolridge | Nov. 3, 1942 |
| 2,337,134 | Thelander | Dec. 21, 1943 |
| 2,547,427 | Zeidler | Apr. 3, 1951 |
| 2,613,785 | Mohns | Oct. 14, 1952 |

FOREIGN PATENTS

| 862,606 | France | Dec. 9, 1940 |
| 1,036,839 | France | Apr. 29, 1953 |